United States Patent
Danilak

(10) Patent No.: US 7,370,153 B1
(45) Date of Patent: May 6, 2008

(54) SYSTEM AND METHOD OF PRE-FETCHING USING AN EXTENDED DATA STRUCTURE INCLUDING REQUIRED DATA AND A PRE-FETCH FLAG

(75) Inventor: Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 245 days.

(21) Appl. No.: 10/912,822

(22) Filed: Aug. 6, 2004

(51) Int. Cl.
*G06F 12/00* (2006.01)
*G06F 13/00* (2006.01)
*G06F 13/28* (2006.01)

(52) U.S. Cl. .................. 711/137; 711/111; 711/112; 712/207; 712/237

(58) Field of Classification Search ............... 711/213, 711/137; 712/207
See application file for complete search history.

(56) References Cited

U.S. PATENT DOCUMENTS

| | | | |
|---|---|---|---|
| 5,802,569 A * | 9/1998 | Genduso et al. ............ 711/137 |
| 5,983,324 A * | 11/1999 | Ukai et al. .................. 711/137 |
| 6,092,149 A | 7/2000 | Hickens et al. | |
| 6,418,516 B1 | 7/2002 | Arimilli et al. | |
| 6,438,673 B1 | 8/2002 | Jourdan et al. | |
| 6,507,894 B1 * | 1/2003 | Hoshi ......................... 711/137 |
| 6,820,173 B1 | 11/2004 | Bittel et al. | |
| 6,915,415 B2 * | 7/2005 | Mayfield et al. ............ 712/225 |
| 6,983,359 B2 * | 1/2006 | Miller ......................... 712/228 |
| 2003/0079088 A1 * | 4/2003 | Malik .......................... 711/137 |
| 2003/0131218 A1 * | 7/2003 | Mayfield et al. ............ 712/225 |
| 2003/0145165 A1 | 7/2003 | Herbst et al. | |
| 2004/0006671 A1 | 1/2004 | Handgem et al. | |
| 2004/0019745 A1 | 1/2004 | Espeseth et al. | |
| 2004/0148471 A1 * | 7/2004 | Wallin et al. ................ 711/137 |
| 2004/0260883 A1 | 12/2004 | Wallin et al. | |
| 2005/0055528 A1 * | 3/2005 | Arimilli et al .............. 711/203 |
| 2005/0080994 A1 | 4/2005 | Cohen et al. | |
| 2005/0262307 A1 | 11/2005 | Chiang et al. | |

FOREIGN PATENT DOCUMENTS

EP 1041497 A2 * 10/2000

* cited by examiner

*Primary Examiner*—Donald Sparks
*Assistant Examiner*—Prasith Thammavong
(74) *Attorney, Agent, or Firm*—Patterson & Sheridan, L.L.P.

(57) ABSTRACT

Method and apparatus for implementing controlled pre-fetching of data. An extended data structure can be used to specifying where and when data is to be pre-fetched, and how much pre-fetching is to be performed, if any. The extended data structure has a pre-fetch flag that signals a host controller if pre-fetching is to be done. If the pre-fetch flag is set, pre-fetching is performed, otherwise pre-fetching is not performed. The host controller parses the extended data structure and formulates a data request that is sent to the disk drive. Pre-fetched data can be stored in a buffer memory for future use.

18 Claims, 6 Drawing Sheets

SYSTEM AND METHOD OF PRE-FETCHING USING AN EXTENDED DATA STRUCTURE INCLUDING REQUIRED DATA AND A PRE-FETCH FLAG

FIELD OF THE INVENTION

This invention relates to memory systems. More specifically, this invention relates to implementing controlled pre-fetch disk reads.

BACKGROUND OF THE INVENTION

Computers and other systems have used disk drives for many years to store digital information. This is because while computers and other systems may have sufficient host memory (such as random access memory) to perform ongoing computational tasks, storing large amounts of data, be it an operating system, application programs, or program data, is impractical using anything except a mass storage device such as a disk drive.

FIG. 1 illustrates a typical prior art computer system 100 that includes a main memory 102 for storing programs and data used by a processor 104. The system 100 further includes auxiliary systems that are generically shown as a chipset 106. The chipset 106 includes a host controller 108 that assists data integration with a disk drive 110. The disk drive 110 includes drive electronics 112 that includes a buffer memory 114. Typically, the buffer memory 114 is a dynamic random access memory (DRAM) of 2 MB-8 MB. Data is passed between the host controller 108 and the drive electronics 112 via a bi-directional bus 116. To enable integration of the various components of the system 100, that system operates under the control of an operating system 118.

Speed is often an important consideration in computer systems, particularly in real-time computing. An important factor in the speed of a computer system is how fast a processor 104 can access data on a disk drive 110. Consequently, a significant amount of attention has been given to improving data access.

While there are many types of disk drives 104, including floppy disks and optical disks, probably the most widely used is the hard disk drive. A hard disk drive can record massive amounts of digital information on concentric memory tracks of a magnetic medium that coats one or more disks. The digital information is recorded as magnetic transitions within the magnetic medium. The disks are mounted on a spindle and turned at very high speeds by a spindle motor. Information on the disks is accessed using magnetic read/write heads located on pivoting arms that move the read/write heads over the disks.

Hard disk drives require more than just mechanical components. Modern hard disk drives include sophisticated drive electronics 112 that include an interface for receiving and transmitted signals and data from and to external devices, such as the host controller 108, and a Head Disk Assembly Interface (not shown) for interfacing the drive electronics 112 to a head disk assembly (also not shown). The head disk assembly includes the disks, the read/write head(s), the spindle motor that rotates the disks, a servo-operated actuator arm that moves the read/write head(s), and other disk drive components. The drive electronics 112 also include servo drivers to move the actuator arms, motor drivers to drive the spindle motor, write drivers to drive the read/write head(s) to write data, an amplifier to amplify data being read, logic to determine where particular data is to be written to or read from, and data formatting electronics to convert incoming data to the proper format for writing and for converting outgoing data to the proper format for the external system. Generally, the drive electronics 112 are operated under the control of a processor. To improve speed and performance, modern drive electronics include the buffer memory 114 (RAM) for temporary storing data.

In addition to improvements to disk drives 110, techniques for efficiently accessing data on the disk drives 110 have been developed. For example, some computer systems incorporate data pre-fetching. That is, when a host controller 108 requests specific data, that specific data plus data at a location or locations (sectors) around the location of the specific data is read and temporarily stored in buffer memory 114. The reason for doing this is that if data at one location is read, the next read is likely to be for data at the next location. For clarity, the specifically requested data will be referred to as required data while the additional data will be referred to as pre-fetched data. Since after reading the required data, a read/write head is already in position to read data at an adjacent location, it can be more efficient to just go ahead and read and temporarily store data, that is, pre-fetch data, at the adjacent location or locations. If pre-fetched data is not requested it can be erased from buffer memory. This technique has proven itself to be highly useful. A typical pre-fetching scheme might be to pre-fetch 4 kB of data. If used, such a pre-fetch will save time, say 48 microseconds of access time.

In the prior art, pre-fetching is performed in two general ways. First, by automatically increasing the amount of data that is read after each read request. This approach has the drawback that if the pre-fetched data is not used, the time required to pre-fetch is wasted. This is because in the prior art all data, the required and the pre-fetched, is first obtained and then the required data is sent. The second approach is to have the host controller receive directions to obtain required data followed by a second request to receive pre-fetch data. In that case, the host controller 108 commands a read of the required data and then the host controller 108 follows that up with another command to pre-fetch data. The second approach has the draw back that separate pre-fetch commands must follow each command to read required data.

Since both approaches have their disadvantages, the first because pre-fetching may not be efficient and the second because multiple requests and commands must be asserted, a new method and apparatus for pre-fetching would be beneficial.

SUMMARY OF THE INVENTION

Embodiments of the principles of the present invention provide for improve data flow from a disk drive to a host system by implementing controlled pre-fetching.

Embodiments of the present invention make use of an extended data structure that includes a pre-fetch flag that is sent to the host controller and that notifies the host controller whether pre-fetching is to be performed. If the pre-fetch flag is set, the host controller implements pre-fetching, otherwise the host controller does not implement pre-fetching. The extended data structure can further include information that notifies the host controller how much data to pre-fetch. In some embodiments the extended data structure can also inform the host controller where the pre-fetch data is to be obtained, and whether the specifically requested data should be made ready prior to pre-fetching.

BRIEF DESCRIPTION OF THE DRAWINGS

The principles of the present invention can be readily understood by considering the following detailed description in conjunction with the accompanying drawings, in which.

DETAILED DESCRIPTION OF THE PREFERRED EMBODIMENTS

The principles of the present invention provide for improved data flow from a disk drive to a host system by implementing controlled pre-fetching. Embodiments of the present invention incorporate an extended data structure that includes a pre-fetch flag that notifies the host controller that pre-fetching is to be performed. The extended data structure can also notify the host controller how much data to pre-fetch, where the pre-fetch data is to be obtained, and whether the specifically requested data should be made available prior to pre-fetching data.

Figure 1:
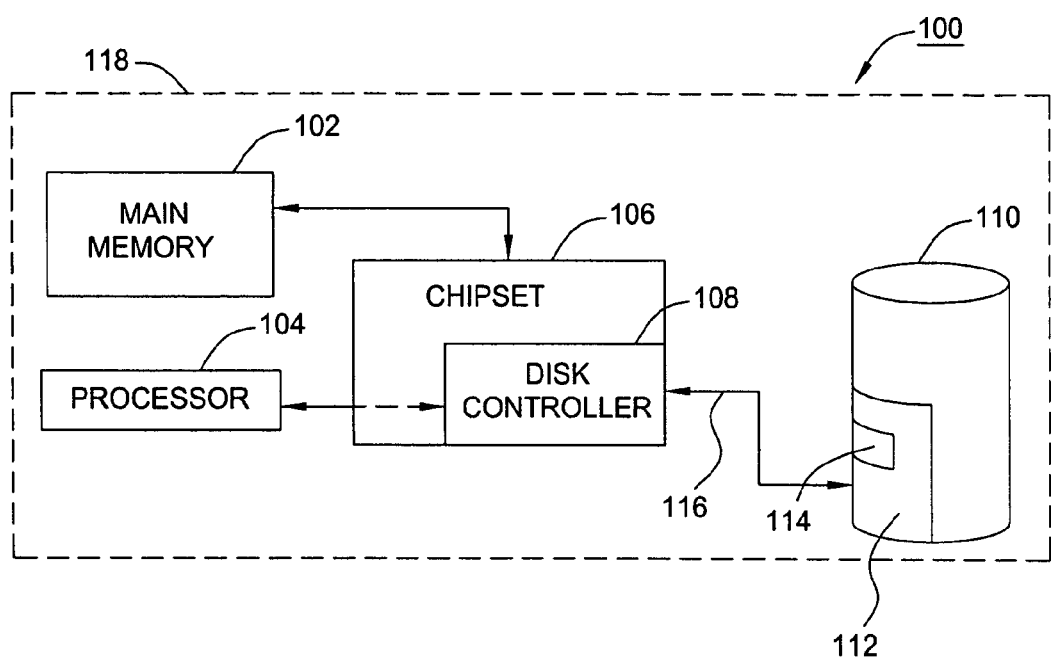
FIG. 1 illustrates a prior art system having host memory and a disk drive.
Figure 2:
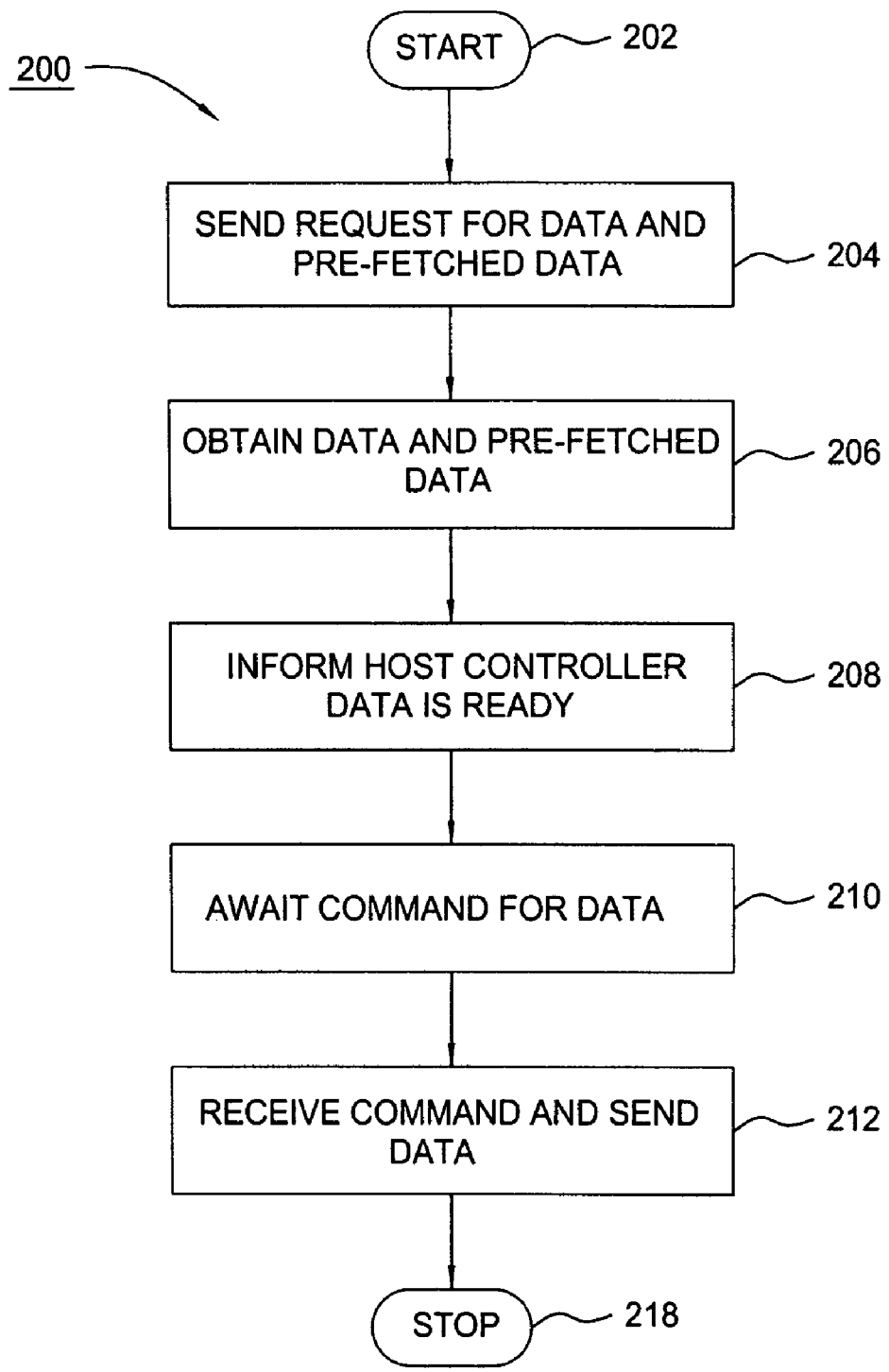
FIG. 2 illustrates a typical prior art method of pre-fetching.

Because the principles of the present invention are related to pre-fetching data, to better understand those principles an understanding of prior art pre-fetching may be helpful. FIG. 2 illustrates a typical prior art method of pre-fetching. As shown, the method 200 starts at step 202 and proceeds at step 204 by a host controller 108 sending a request for data, including pre-fetch data, to disk electronics 112. That request includes a request to pre-fetch data, because the system automatically pre-fetches a predetermined amount of data. When the host controller 108 requests data, at step 206 that data and pre-fetched data from an adjacent location are obtained.

After both the required data and the pre-fetched data have been obtained, at step 208 the disk electronics 112 informs the host controller 108 that data is ready. Then, at step 210 the disk electronics 112 awaits a command from the host controller 108 to send the data. At step 212, after the disk electronics receives a command to send the data, the disk electronics 112 sends the required data and the pre-fetched data to the host controller 108 and the method 200 stops at step 218. Note that prior to step 208 the disk electronics 112 obtains both the required data and the pre-fetched data before the disk electronics 112 informs the host controller 108 that data is ready. If the pre-fetched data is not going to be used, the time required to recover the pre-fetched data is wasted.

Figure 3:
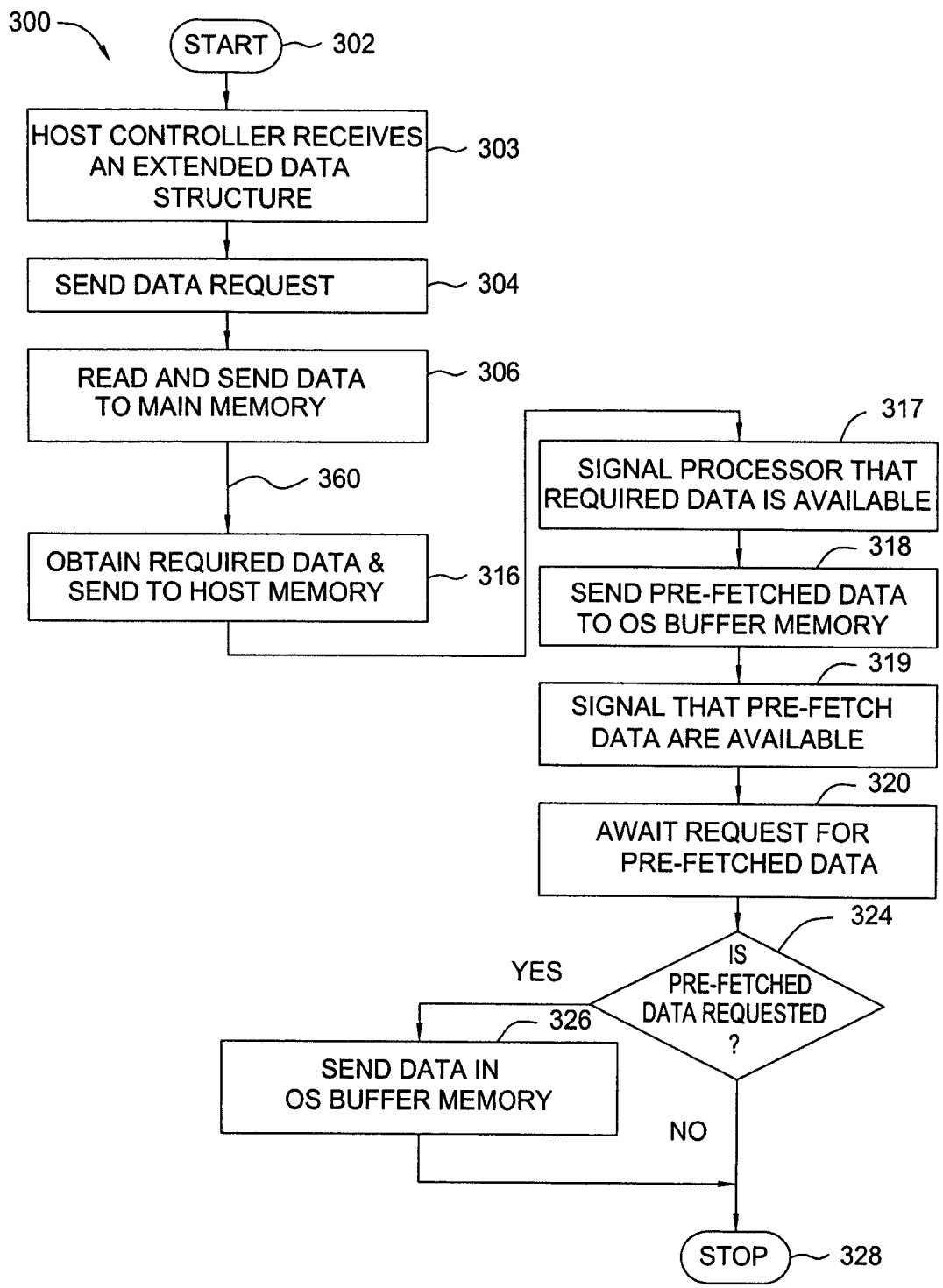
FIG. 3 illustrates a method of pre-fetching that is in accord with the principles of the present invention.

FIG. 3 illustrates a method 300 of operating a system that is in accord with the principles of the present invention. The method 300 implements controlled pre-fetching. In the method 300 pre-fetching is controlled by an extended data structure (discussed subsequently) that directs the host controller that pre-fetching is to be performed. That extended data structure can also inform the host controller how much data should be pre-fetched, and, possibly, from where the pre-fetched data should be obtained and when it is to be performed. While pre-fetching is typically performed at locations that follow the location of the required data, the method 300 can pre-fetch data from locations that follow the required data and/or that precede the required data.

The method 300 starts at step 302 and proceeds at step 303 by a host controller receiving a command in the form of the extended data structure, (reference to FIG. 5) from a processor to obtain data. It should be understood that the processor is operating under the control of both an operating system and an application program. When servicing the application program requires data, the processor sends a request for the required data. The operating system causes the processor to form the extended data structure, which specifies the required data and which includes a pre-fetch flag. The pre-fetch flag informs the host controller whether pre-fetching is to be performed: if the pre-fetch flag is set, pre-fetching is performed; if clear, pre-fetching is not performed.

The extended data structure can also include other information. For example, the extended data structure can inform the host controller how much data to pre-fetch, when to pre-fetch, and from where the data should be fetched, before or after the required data.

Then, at step 304 the host controller sends a data request to the disk electronics. To do so, the host controller examines the extended data structure and formulates a suitable data request. For example, if 4 kB of required data is needed, and if the operating system (or other controlling mechanism) commands 12 kB of pre-fetched data, the host controller formulates a request for 16 kB of data. After formulation, that request is sent to the disk electronics. In response, at step 306 the disk electronics starts reading the data (here, 16 KB) and at step 310 the disk electronics sends that data to the host controller.

At step 316 the host controller then obtains and sends the required data to the main memory. As soon as the required data are written to memory, at step 317, then host controller signals to processor that required data are available. Meanwhile, at step 318 the disk electronics continues reading and sending pre-fetch portion of data while the disk controller is writing them into the operating system memory. Once pre-fetch data are written to memory, at step 319 the host controller signals that pre-fetch data is available. Then, at step 320 the host controller awaits a command from the processor that pre-fetched data is requested.

At step 324 a determination is made as to whether pre-fetched data is requested. If it is, at step 326 the operating system sends the pre-fetched data in the OS buffer memory to the requesting application, and the method 300 then stops at step 328. However, if at step 324 the pre-fetched data is not requested, eventually, such as by time-out or overwrite of the pre-fetched data by other pre-fetching, the method 300 stops at step 328.

The extended data structure can include content that signals where data is to be pre-fetched from. For example, the operating system can determine that pre-fetching data from before the location of the required data is beneficial. In that case, the host controller formats the data request to the disk electronics such that the desired data is pre-fetched.

Figure 4:
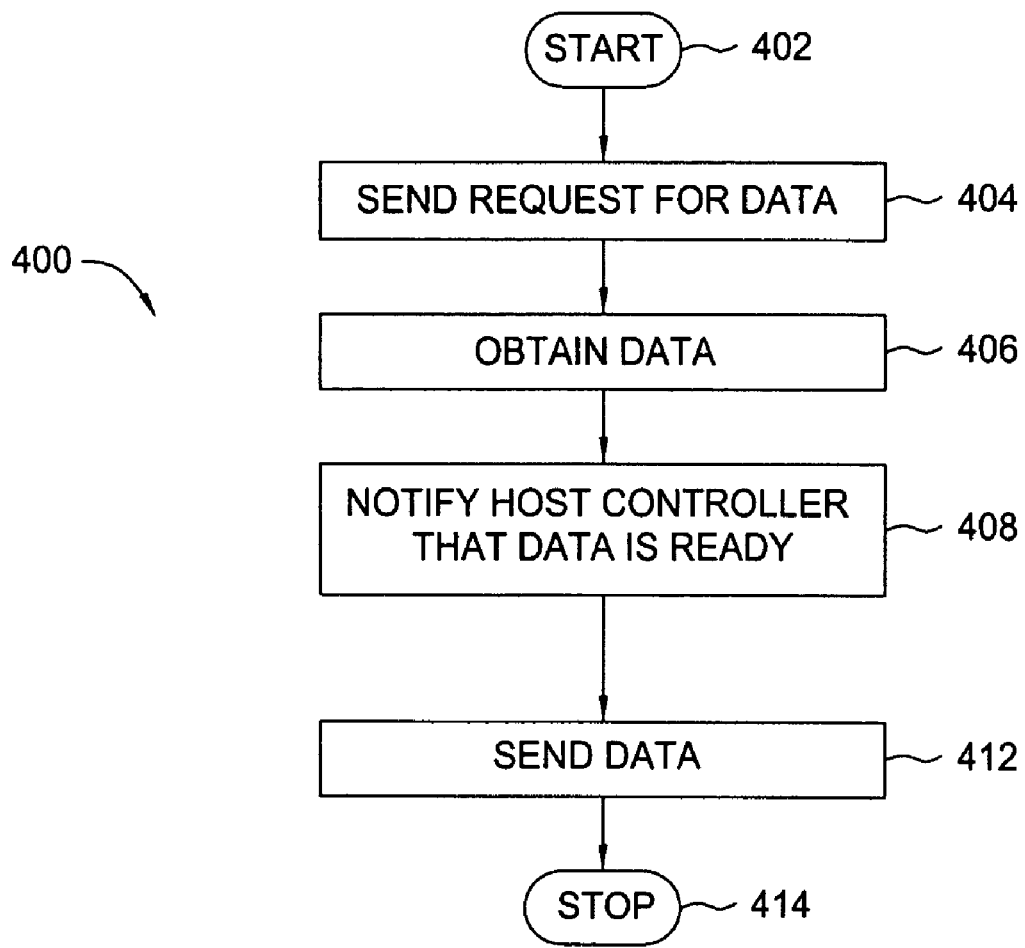
FIG. 4 illustrates a method of not pre-fetching that is in accord with the principles of the present invention.

The principles of the present invention provides for pre-fetching, as in the method 300, or no pre-fetching. FIG. 4 illustrates a method 400 in which pre-fetching is not performed. In the method 400 the processor requests required data, but the operating system does not set the pre-fetch flag. This may be because the application program is of the type that may not benefit from pre-fetching or because too many times when running the application pre-fetched data is not used.

The method 400 starts at step 402 and proceeds at step 404 by a processor sending a data request to a host controller for required data to service an application program. The host controller parses that request and, since the pre-fletch flag is not set, simply commands the disk electronics to obtain the required data. Then, at step 406 the disk electronics obtains the required data and at step 412 the disk electronics sends the required data to the host controller. Then, the method stops at step 414.

Figure 5:
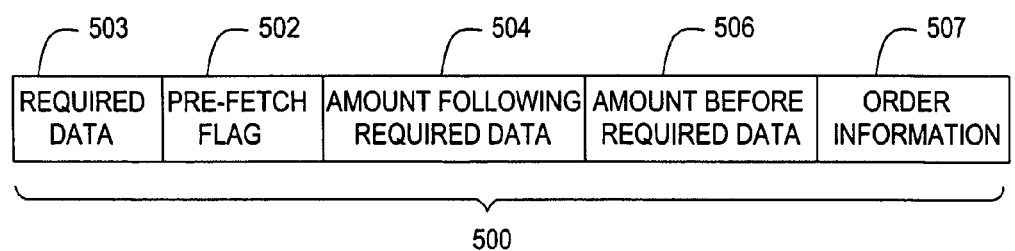
FIG. 5 illustrates a data structure that is in accord with the principles of the present invention.

FIG. 5 illustrates an extended data structure 500 that includes a pre-fetch flag 502. When the pre-fetch flag 502 is set, the method 300 is performed, when the pre-fetch flag 502 is clear, the method 400 is performed. In addition, the extended data structure 500 includes a request 503 to obtain the required data. The extended data structure 500 can also include instructions 504 regarding the amount of data to be pre-fetched from locations following the location of the required data. In some embodiments, the extended data structure 500 can include instructions 506 that inform the disk electronics how much data to pre-fetch before the required data. This enables pre-fetching both before and after the locations from which the specifically required data is obtained. It should be noted that the instructions 504 and 506 are not always required. Some embodiments of the present invention will pre-fetch fixed amounts from specific locations relative to the required data. The extended data structure 500 can also include order information 507 that directs whether pre-fetched data is to be sent before or after the required data is sent to the host controller.

Figure 6:
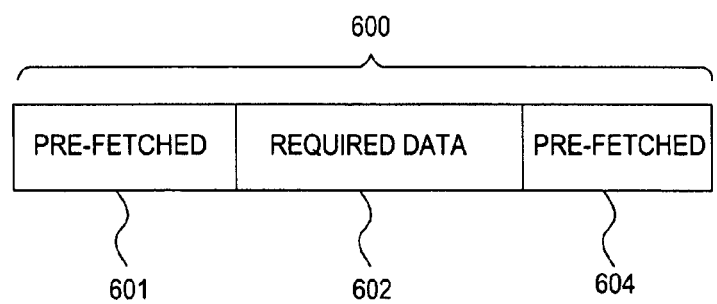
FIG. 6 illustrates a data packet having required and pre-fetched data.

FIG. 6 shows a data packet 600 sent by the disk electronics to the host controller. The data packet 600 is comprised of the pre-fetched data 601 that was requested to service the application program, the required data 602, and the pre-fetched data 604. In the method 300, the host controller sends the required data 602 to the processor as soon as it becomes available. This enables the processor to immediately begin processing that data. After the required data is received, the pre-fetched data 604 is stored in the OS buffer memory. By controlling the order information 507 the order of the data in the data packet can be switched.

Figure 7:
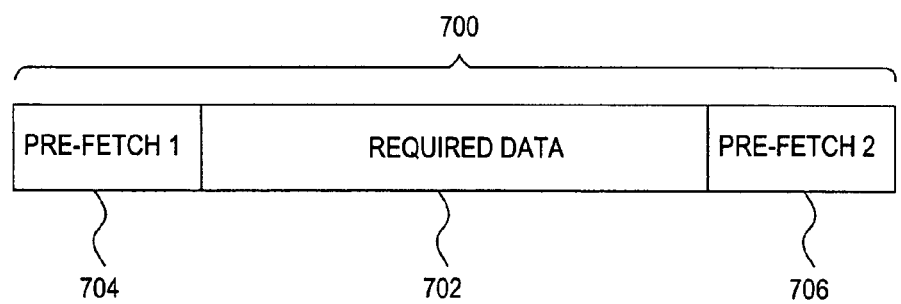
FIG. 7 illustrates a data packet having pre-fetched data from both before and after the required data.

FIG. 7 illustrates an alternative data packet 700. The data packet 700 includes not only the required data 702 (which services the application program), but also pre-fetched data 704 from locations before the location of the specifically required data 702, and pre-fetched data 706 from locations after the location of the specifically required data 702.

Figure 8:
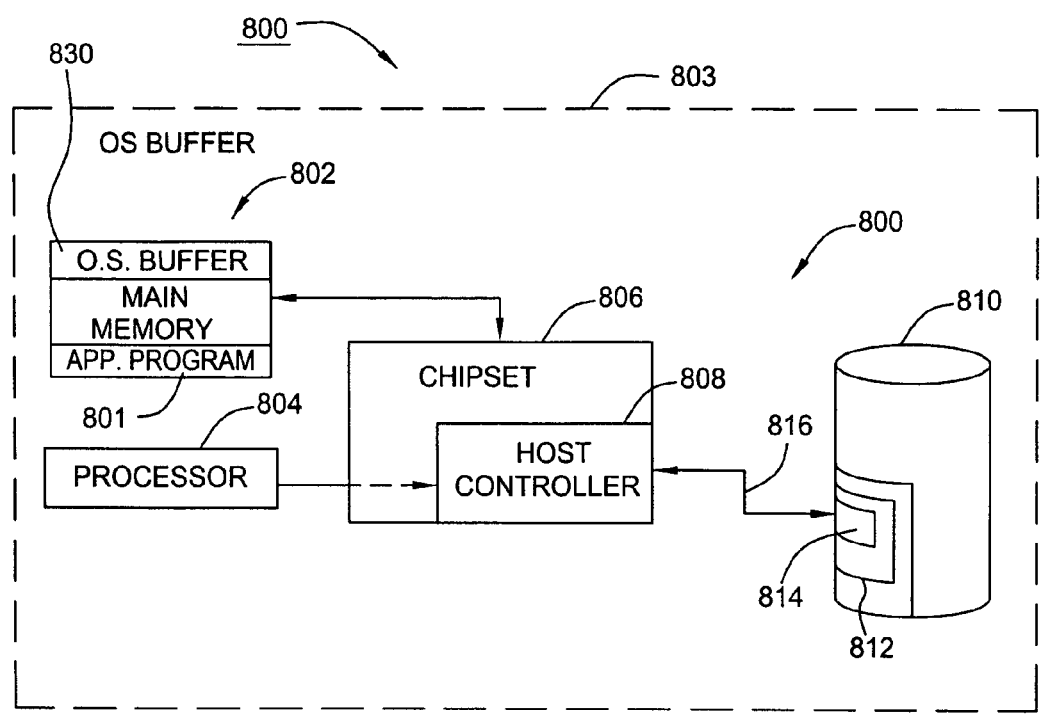
FIG. 8 illustrates an apparatus that is in accord with the principles of the present invention.

FIG. 8 illustrates a computer system 800 that is in accord with the principles of the present invention. That system includes a main memory 802 for storing programs and data used by a processor 804 during the operation of the system. Those programs include an application program 801 and an operating system 803 (shown as globally controlling the system 800). The system 800 further includes auxiliary systems that are generically shown as a chipset 806. The chipset 806 includes a host controller 808 that, as controlled by the processor 804 in accord with the operating system 803 and the application program 801, assists data integration with a disk drive 810. The disk drive 810 includes drive electronics 812 that includes a buffer memory 814. The disk drive 810 is a computer readable medium that can permanently store the operating system 803 and the application program 801 that implement the methods 300 and 400 and that creates an extended data structure such as that shown in FIG. 5. Data is passed between the host controller 808 and the drive electronics 812 via a bi-directional bus 816. The various components of the system 800 are integrated together by the operating system 803 (as suggested by the dashed lines) The main memory 802 includes a portion 830 that is used for the OS buffer memory that stores pre-fetched data. Of course, other locations for the OS buffer memory are possible.

Although the invention has been described with reference to preferred embodiments, workers skilled in the art will recognize that changes may be made in form and detail without departing from the spirit and scope of the invention. The embodiments shown in the figures are provided by way of example only.

What is claimed is:

1. A method for processor controlled prefetching, comprising the steps of:

for every fetch of required data, forming an extended data structure that identifies a first amount of required data that is to be retrieved and includes a pre-fetch flag for controlling whether pre-fetching is also to be performed, wherein a different extended data structure is formed for each amount of required data that is to be retrieved prior to fetching any required data;

receiving the extended data structure;

determining if pre-fetching is to be performed based on whether the pre-fetch flag in the extended data structure is set;

formulating a command to obtain the required data as well as pre-fetch data, wherein the command includes pre-fetch information indicating how much pre-fetch data is to be obtained;

sending the command to a disk memory;

receiving both the first amount of required data and the pre-fetch data from the disk memory in response to the command; and signaling the processor that the required data is stored in memory while continuing to read and store the prefetch data without interruption.

2. The method of claim 1, wherein the command controls how much of the pre-fetch data to pre-fetch from disk locations immediately following a disk location that stores at least part of the first amount of required data.

3. The method of claim 1, wherein the extended data structure further includes order information that specifies when data is pre-fetched relative to the first amount of required data, and wherein the command depends on the order information.

4. The method of claim 3, wherein the command controls exactly how much of the pre-fetch data to pre-fetch from disk locations immediately following a disk location that stores at least part of the first amount of required data.

5. The method of claim 1, further including the step of separating the first amount of required data and the pre-fetched data from the data received in response to the command.

6. A computer system for processor controlled prefetching, comprising:

a processor, configured to form for every fetch of required data an extended data structure that identifies a first amount of required data that is to be retrieved and includes a pre-fetch flag for controlling whether pre-fetching is also to be performed, wherein a different extended data structure is formed for each amount of required data that is to be retrieved prior to fetching any required data;

a host controller, configured to
  receive the extended data structure,
  determine if pre-fetching is to be performed based on whether the pre-fetch flag in the extended data structure is set, and
  formulate a command to obtain the first amount of required data as well as pre-fetch data, wherein the command includes pre-fetch information indicating how much pre-fetch data is to be obtained;
a disk drive, configured to obtain both the first amount of required data and the pre-fetch data in response to the command, said disk drive further configured to send obtained data to the host controller, wherein said host controller receives obtained data, parses said first amount of required data from said obtained data, and sends said first amount of required data to said processor while continuing to read and store the prefetch data without interruption.

7. The computer system of claim 6, wherein said command causes pre-fetched data to be obtained if said pre-fetch flag is set.

8. The computer system of claim 7, further including a buffer memory that is operatively connected to said host controller, wherein said host controller is further configured to send pre-fetched data to said buffer memory.

9. The computer system of claim 6, wherein said extended data structure is further comprised of pre-fetch information that directs how much data is to be pre-fetched.

10. The computer system of claim 9, wherein the pre-fetch information controls exactly how much data is pre-fetched from locations after a location that stores the first amount of required data.

11. The computer system of claim 9, wherein the pre-fetch information controls exactly how much data is pre-fetched from locations before a location that stores the first amount of required data.

12. The computer system of claim 9, wherein the extended data structure further includes order information that specifies when data is pre-fetched relative to the first amount of required data.

13. The computer system of claim 6, wherein said host controller sends the first amount of required data to the processor before pre-fetched data is received.

14. A computer readable medium for storing instructions to perform processor controlled prefetching, comprising the steps of:

for every fetch of required data, forming an extended data structure that identifies a first amount of required data that is to be retrieved and includes a pre-fetch flag for controlling whether pre-fetching is also to be performed, wherein a different extended data structure is formed for each amount of required data that is to be retrieved prior to fetching any required data;

receiving the extended data structure;

determining if pre-fetching is to be performed based on whether the pre-fetch flag in the extended data structure is set;

formulating a command to obtain the first amount of required data as well as pre-fetch data, wherein the command includes pre-fetch information indicating how much pre-fetch data is to be obtained;

sending the command to a memory device;

receiving both the first amount of required data and the pre-fetch data from the memory device in response to the command; and signaling the processor that the required data is stored in memory while continuing to read and store the prefetch data without interruption.

15. The computer readable medium of claim 14, wherein the instructions cause the command to control exactly how much data to pre-fetch from disk locations after a disk location that stores the first amount of required data.

16. The computer readable medium of claim 14, wherein the instructions cause the extended data structure to further include order information that specifies when data is pre-fetched relative to the first amount of required data, and wherein the instructions cause the command to depend on the order information.

17. The computer readable medium of claim 16, wherein the instructions cause the command to control exactly how much data to pre-fetch from disk locations before a disk location that stores the first amount of required data.

18. The computer readable medium of claim 14, wherein the instructions cause further cause separating the first amount of required data and the pre-fetched data from the data received in response to the command.

* * * * *